B. O. HALE.
RUBBER MIXING MILL.
APPLICATION FILED AUG. 17, 1915.

1,189,444.

Patented July 4, 1916.
7 SHEETS—SHEET 5.

B. O. HALE.
RUBBER MIXING MILL.
APPLICATION FILED AUG. 17, 1915.

1,189,444.

Patented July 4, 1916.
7 SHEETS—SHEET 6.

INVENTOR.
B. O. Hale
BY
ATTORNEY.

UNITED STATES PATENT OFFICE.

BERNARD O. HALE, OF ANSONIA, CONNECTICUT, ASSIGNOR TO FARREL FOUNDRY & MACHINE COMPANY, OF ANSONIA, CONNECTICUT, A CORPORATION OF CONNECTICUT.

RUBBER-MIXING MILL.

1,189,444.　　　　　Specification of Letters Patent.　　　Patented July 4, 1916.

Application filed August 17, 1915.　Serial No. 45,984.

*To all whom it may concern:*

Be it known that I, BERNARD O. HALE, a citizen of the United States, residing in Ansonia, county of New Haven, and State of Connecticut, have invented certain new and useful Improvements in Rubber-Mixing Mills, of which the following is a full, clear, and exact description.

This invention relates to mills for mixing rubber and similar substances, and more especially to mills of the type in which two oppositely driven rolls are employed for mixing coloring material or other compounds, etc., with crude rubber. In mills of this character as at present constructed, one of the rolls is usually driven faster than the other, and as the crude rubber is passed through the rolls it clings to the slow one, the foreign substance or compound with which the rubber is to be mixed being deposited between the rolls, or upon the rubber clinging to the slow roll, and the surplus material which falls between the rolls being returned to the slow roll by an endless feed apron located beneath the rolls and running in contact with the slow roll, which is usually located at the front of the mill.

Usually the feed apron or belt is supported on three or more rollers, and is driven by contact with the slow roll; and provision is made for collapsing it when it is desired to remove the layer of rubber from the apron driving roll. One of the great objections to this type of mill arises from this collapsing of the endless mixer apron which, when collapsed, hangs loosely from the supporting rollers and falls into the pan located beneath the main rolls, where it is likely to become entangled with the batch of rubber being worked. The apron also takes up lumps of dirty matter and impurities which have to be removed before the next batch is mixed. Furthermore, when the apron is collapsed or taken down, it is sometimes a difficult matter to tighten it up in a position in which it will run perfectly true. In other words, after a proper adjustment of the apron on the rollers has been effected, such adjustment is destroyed when the apron is collapsed, so that if, under certain conditions, it runs true on the supporting rollers, it is likely to be displaced on the rollers after being collapsed and tightened up again, so that it will then wabble from side to side and give unsatisfactory results.

One of the primary objects of the present invention is to eliminate the drawbacks above noted, and to provide a mixing mill in which the apron is maintained in a taut condition when moved out of contact with its driving roll. In the inoperative position, the apron is so supported that it will not fall into the pan, and at the same time the entire front surface of the apron-driving roll is easily accessible. Furthermore, by keeping the apron taut when it is moved from operative to inoperative position and vice versa, the lateral adjustment of the same on the supporting rollers can be maintained, thereby avoiding the disadvantage above noted.

Other objects of the invention are to provide a mill in which the pan beneath the rolls is substantially unobstructed by the apron and the other machine parts, and readily accessible for cleaning; and to improve the general construction and operation of devices of the class to which the invention relates.

To these and other ends, the invention consists in the novel features and combinations of parts to be hereinafter described and claimed.

In the accompanying drawings, Fig. 7 is a generally similar view, showing the apron in the inoperative position; Fig. 7$^a$ is a detail showing the means of supporting one of the apron rollers.

Figure 1:
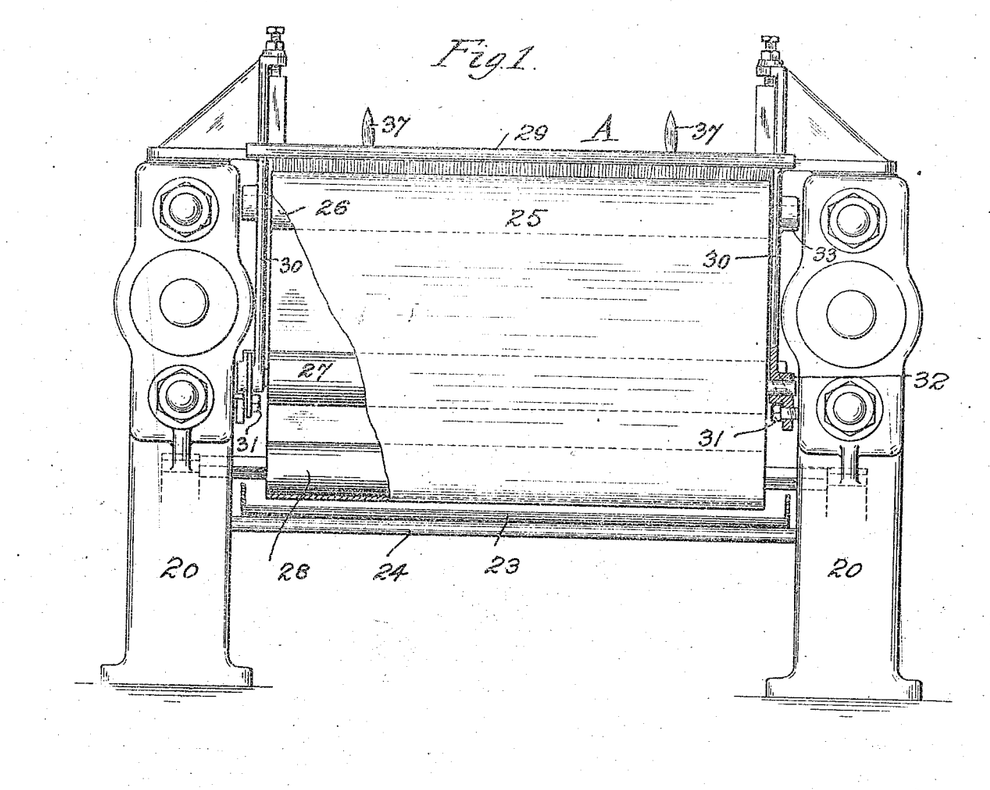
Figure 1 is a front elevation of a rubber mixing mill embodying my improvements, with certain parts in section.
Figures 2, 3:
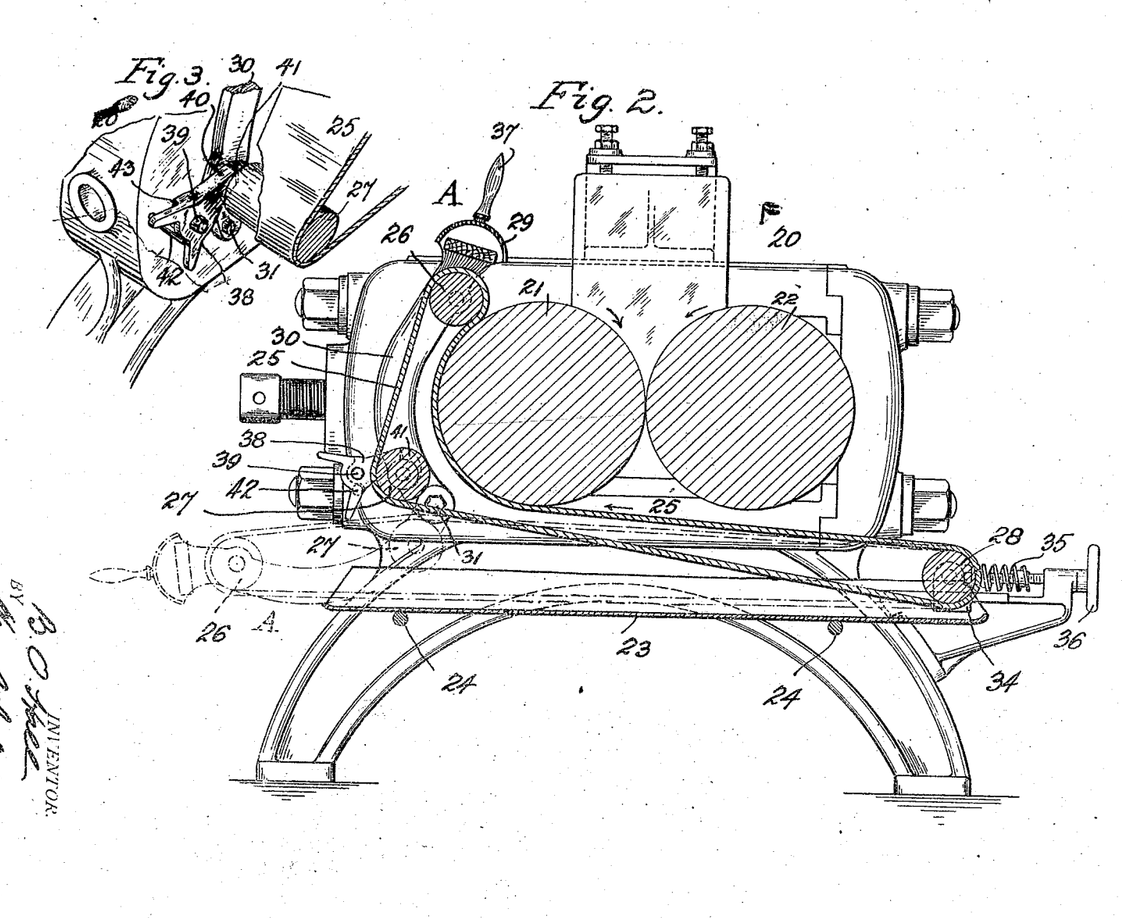
Fig. 2 is a cross section of the mill shown in Fig. 1.
Fig. 3 is a perspective detail of the locking device for the apron supporting frame.

In Figs. 1 and 2, I have shown a small mill in which the mixing apron is moved into and out of operative position by hand.

The frame 20, of ordinary construction, supports the usual slow front roll 21 and fast rear roll 22 that are driven by the usual instrumentalities, which it is not necessary to illustrate. Beneath these rolls is the ordinary pan 23 which may be supported on tie rods 24 connecting the side frames, as shown. The mixing apron 25, which is in the form of an endless belt, is located in part beneath the rolls and between said rolls and the pan; and said apron is supported on suitable supporting rollers 26, 27, 28 and driven by contact with the roll 21. The supporting rollers are so arranged that the apron curves up over the front surface of the roll 21, which drives the apron in such a direction that any coloring material, etc. falling between the rolls is caught by the apron and returned to and mixed with the layer of crude rubber which adheres to the slow roll 21.

In carrying out my invention, I provide means for keeping the apron taut when in the inoperative position, as well as in the operative position, and to this end, the construction may be as follows: Slightly below and in front of the roll 21, I pivot a frame A, comprising a transverse member 29 and supporting arms or side members 30. At their lower extremities, the arms 30 are pivoted to the inner faces of the respective side frames by means such as the bolts 31, whereby the frame is enabled to swing up and down in front of the roll 21. At a point eccentric to the pivot 31 and in rather close proximity thereto, each arm 30 of the frame A is provided with a bearing 32 for the apron supporting roller 27 previously mentioned. Above this roller 27, the frame A carries the roller 26 in similar fashion, the shaft of said roller being journaled in suitable bearings 33 so located that the roll 26 is slightly beneath the cross member 29 and in parallelism with the roll 27. The third apron supporting roller 28, is located at the lower rear part of the main frame, and is journaled in movable bearings 34, which are constantly urged in a rearward direction by means of springs 35 adjustable by hand wheels 36. In Fig. 2 I only show the parts 34, 35, 36 employed at one side of the machine, but it will be understood that a duplicate arrangement is used at the other side. The springs 35, by pulling rearwardly on the apron, exert a tension thereon which can be regulated by the adjusting wheels 36.

One or more handles 37 are provided on the cross member 29 of the frame A for the purpose of manipulating said frame. Furthermore, I employ a lock for holding the frame in the operative position shown in full lines in Fig. 2. By preference, a lock member 38 comprising a dog pivoted to one of the side frames by a pin 39 has an end portion 40 adapted to engage and disengage a cam shaped projection 41 on the corresponding arm 30. The movement of the pivoted locking member 38 is limited by a stop pin 42 coöperating with a shoulder 43 on the locking member, as shown in Fig. 3.

The operation of this form of mill will be obvious for the most part from the foregoing description. The crude rubber clings to the slow front roll 21, and as the rolls rotate the fast roll 22 works into the rubber layer the coloring material deposited in the space between the rolls. That portion of the coloring material which drops between the rolls is caught on the belt 25 and immediately moved into contact with the layer of crude rubber and carried around with the roll 31, and this operation is repeated indefinitely so that the coloring material is thoroughly worked into the crude rubber and a homogeneous mixture is produced. During the operation, the lock 38 holds the frame A and the apron tightly in the operative position. When the batch has been properly mixed and it is desired to remove the layer of rubber from the front roll, the locking dog 38 is released in an obvious manner and the frame A is swung down into the position shown by the dotted lines in Fig. 2. By supporting both rollers 26, 27, on the frame A and pivoting the frame at a suitable point, I am enabled to preserve the tautness of the apron while it is being moved from the operative to the inoperative position. In order to produce this result, both rollers 26, 27 have concentric swinging movements about a single pivot, one being located closer to the pivot than the other. It will be observed that when the apron is in the inoperative position, its tightness prevents it from falling down into the pan where it could collect impurities, etc., and that the whole front surface of the roll 21 is readily accessible for cutting off the material adhering to the roll. When another mixing operation is to be commenced, the apron may be readily moved into the operative position again by lifting the swinging frame A into the position shown in Fig. 2 and relocking it in that position. During this manipulation, the tautness of the apron is still preserved so that the apron will maintain its adjustment on the supporting rollers. Furthermore, it will be observed that when the apron is in the operative position, the pan 23 is wide open at the front end so as to be readily accessible, the roller 27, in the operative position of the apron being located considerably above the front end of the pan, and in close proximity to the roll 21, so as to give the apron an upward slant. This enables the pan to be cleaned out readily from the front of the machine because there is a considerable space between it and the apron, and this space is entirely unobstructed.

The springs 35 aid in preserving the tautness of the apron, as will be manifest. In moving the frame A downward, the resistance of these springs has to be overcome until the axis of the roll 26 passes beyond an imaginary line connecting the pivots 31 and the axis of the roll 28, but this can be readily done by hand in a small machine. After the center line has been passed, the tendency of the springs is to pull the frame A downward. In the form shown, it is arrested in the desired position by contact with the front edge of the pan.

Figures 4, 9:
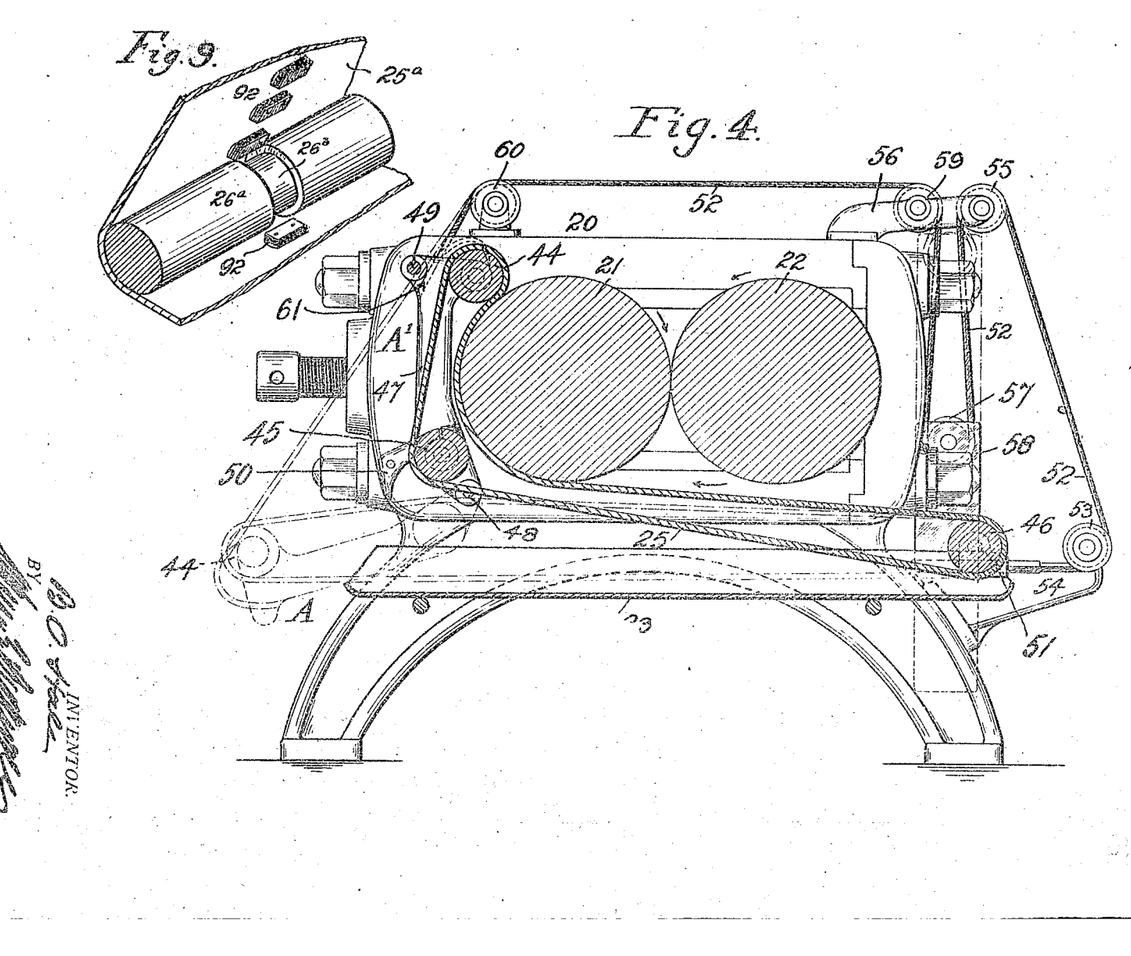
Fig. 4 is a cross section showing a mill of somewhat modified type.
Fig. 9 is a perspective detail showing a means for preventing wabbling of the apron.
Figure 5:
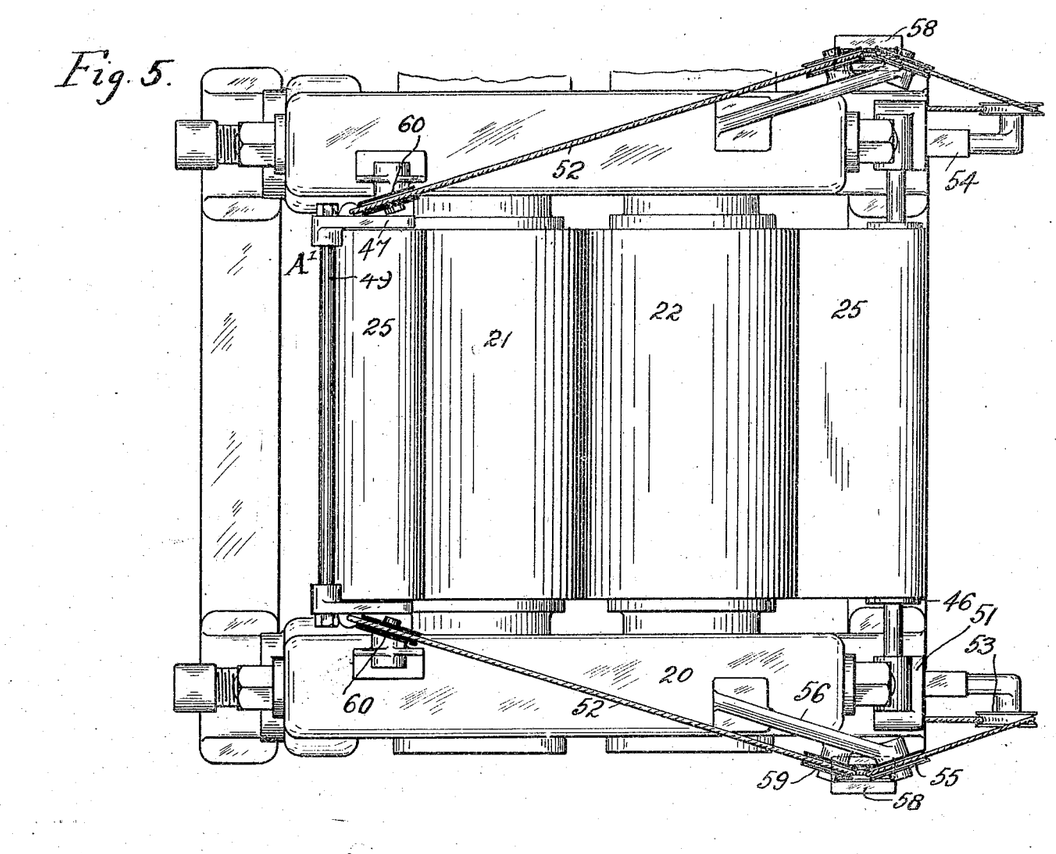
Fig. 5 is a plan view of the mill shown in Fig. 4.

In the modification shown in Figs. 4 and 5, the apron tensioning springs are replaced by counterweights. In this construction, the apron 25 is supported on rollers 44, 45, 46 corresponding generally in arrangement and function to the rollers 26, 27, 28 previously described. The rollers 44, 45 are supported on a frame A' comprising side members 47 pivoted to the main frame at 48 and interconnected by a tie rod 49. The frame A' can be locked in the operative position by means of a locking dog 50 corresponding generally to the locking dog 38 previously described. The rear supporting roller 46 is mounted in movable bearings 51 adapted to slide forwardly and rearwardly in suitable guides, and the bearing blocks 51 are each connected with a rope 52 passing upward over a sheave 53 supported by a bracket 54 at the lower part of the machine. From the sheaves 53, the ropes 52 pass upwardly over sheaves 55 supported on brackets 56, and thence downwardly under sheaves 57 attached to counter-weights 58 at the respective sides of the machine. From the sheaves 57 on the counter-weights, the ropes 52 pass upwardly over sheaves 59 likewise carried by the brackets 56, and thence forward and downward over sheaves 60 on the side frames of the machine substantially above the frame A', the extremities of the ropes being connected at 61 to the upper ends of the frame arms 47. By this construction, the tendency of the counter-weights is to tension the apron by pulling the supporting roller 46 rearwardly. i. e., to the right (Fig. 4), and also by pulling the swinging frame A' to the right, so that the loop of the apron will be pulled around the roll 21, as shown.

After a batch of material has been mixed by the rolls 21, 22, the apron is moved into the inoperative position shown by the dotted lines in Fig. 4. This may be readily effected simply by releasing the lock 50 and by pulling outwardly on the tie-rod 49 so as to lower the frame A' to the inoperative position. The preponderance of aggregate weight of the frame A' and its rollers is located in front of the pivotal points 48, so that the frame is only held up in operative position by the counterweights 58. As the roller 44 passes downward beyond the imaginary line connecting the axis of roller 46 with the pivots 48, the counterweights tend to pull the frame A' downward instead of upward, as will be understood. The counterweights will automatically return the apron to its initial position when the frame A' is again pushed up beyond such imaginary line, as will be manifest.

It may be stated at this point that in the drawings I have not shown the sub-base on which the machine is supported, and which, in the form shown in Figs. 4 and 5, provides for a sufficient range of movement of the counter-weights. Of course, the counterweights tension the apron by means of roller 46 when the apron is in the inoperative position, as well as when it is in the operative position. In certain cases only one counterweight need be employed.

Figure 6:
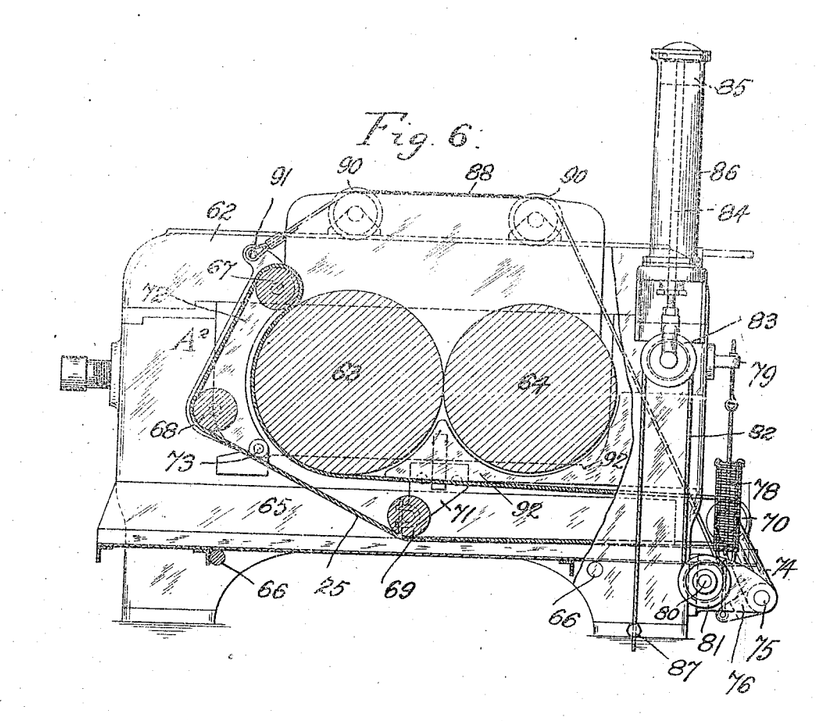
Fig. 6 is a cross section of a mill of still another type, with certain parts in elevation, showing the apron in the operative position.
Figures 7, 7A:
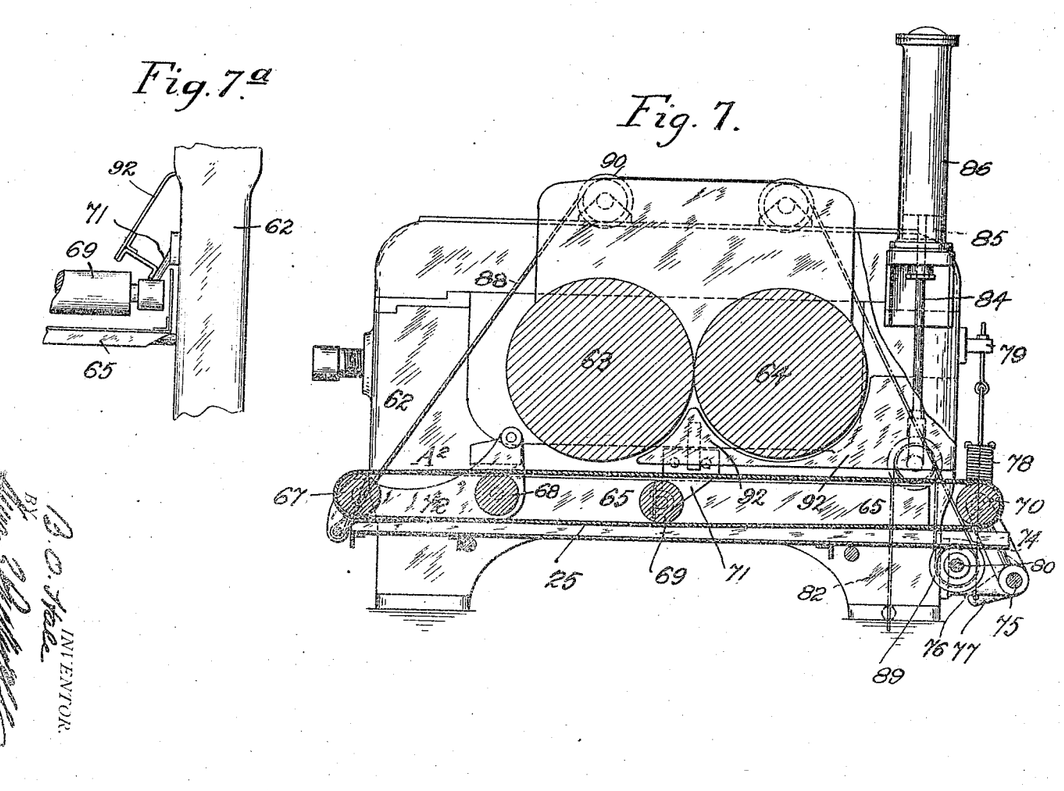
Figure 8:
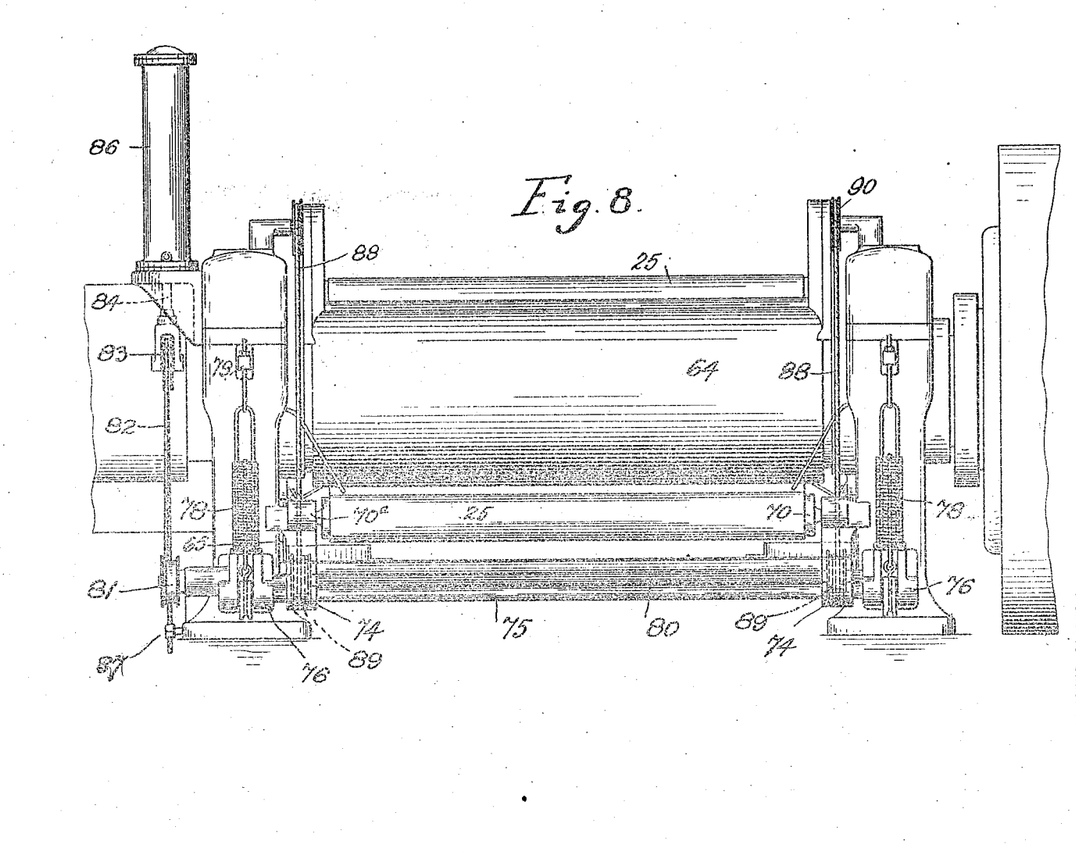
Fig. 8 is a rear elevation of the mill shown in Figs. 6 and 7.

Figs. 6, 7 and 8 show a still further modified form of the invention which is applicable to larger mills owing to the fact that the apron shifting mechanism is operated by power; for example, a cylinder and piston actuated by compressed air. The frame 62 is provided with the usual mixing rolls 63, 64 corresponding to those previously described, and the apron has substantially the same relation to the rolls as previously described, being located between said rolls and the pan 65, which, in this case, is supported on tie rods 66. However, in the form now under discussion, four apron supporting rollers 67, 68, 69, 70 are employed. The rollers 67, 68 are mounted in front of the roll 63 on a frame A² corresponding substantially to the frame A', hereinbefore described. The roller 70 also corresponds in location and function to the rear tension roller hereinbefore described. The fourth or additional roller 69 is located in the loop of the apron at a point beneath the rolls 63, 64, said roller being journaled in brackets 71 depending from the side frames. In this manner, the roller 69 may be located within the pan 65, but entirely free thereof, so that the pan can be removed without disturbing the apron. It will be noted that in the operative position of the apron, shown in Fig. 6, the latter slants forwardly and upwardly from the roller 69 so as to leave the front end of the pan open and unobstructed as in the examples previously described. The frame A² comprises side arms 72, pivoted to the respective side frames at 73, so that when the frame is swung down, as shown in Fig. 7, all four of the apron supporting rollers may be substantially in line with each other. In this case also, the apron is held taut while in the inoperative position, as well as while in the operative position.

The tension roller 70 is mounted in bearings 70ª in the ends of rock arms 74 fixed to the rock shaft 75 extending across the machine at the lower rear portion of the latter and supported in brackets 76. Rock arms 77 are also fixed on the shaft 75, and are connected by means of springs 78 with brackets 79 on the upper part of the frame. The springs 78 tend to pull the arms 77 upwardly and thereby shift the arms 74 rearwardly in order to tension the apron by means of the roller 70. The brackets 76 also serve as bearings for a transverse winding shaft 80, carrying at one end a drum 81. A rope 82 is fixed to this drum and passes up over a sheave 83 carried by a piston rod 84 of a piston 85 working in a cylinder 86. From the sheave 83, the rope 82 passes downward and is attached to any suitable fixed point, as indicated for example at 87. It will be obvious that by this arrangement, the shaft 80 will be turned in one direction as the piston is raised, and is free to turn in the other direction when the piston is lowered.

By preference, the cylinder and piston are operated by compressed air, which is adapted to raise the piston for the purpose of rotating shaft 80 in a clockwise direction (Fig. 6). This will raise the frame and apron into the position shown in Fig. 6, by means of ropes 88 wound on drums 89 on shaft 80 and passing over sheaves 90 on the side frames, the extremities of said ropes being connected to a tie rod 91 connecting the side members of the frame A². As long as compressed air is admitted to the cylinder 86, the apron will be held in the operative position by means of the connections described. However, upon exhausting the air from the cylinder, the piston will fall by gravity, thereby permitting the drum 81 to turn in a counter-clockwise direction and releasing the frame A² connected with the drums 89 by ropes 88, so that the frame will fall into the position shown in Fig. 7. In this position, the apron is held taut, out of contact with the pan, and the front roll 63 is freely accessible. When another batch is to be mixed, air is admitted to the cylinder 86 so as to pull up the apron into the operative position in an obvious manner. As long as the air pressure is continued, the apron is tightly held in the operative position. When large lumps of material pass between the roll 63 and the apron, the roller 70 yields to a certain extent as does also the frame A², and as the rollers on the frame are always maintained in parallelism the wabbling of the apron is prevented.

In the form of the invention last described, it will be apparent that all four of the apron supporting rollers (two on the main frame and two on the swinging frame) are in line with each other when the apron is down in the inoperative position. When the apron is up in the operative position, the pan is wide open from the front of the machine to a point near the center thereof so that it is easily accessible for cleaning out, and as the apron rollers and fixtures are independent of the pan, it is easy to remove the latter at any time if desired. Located between the mixing rolls and extending rearwardly from the rear mixing roll are guide members or plates 92 which extend along the upper run of the mixing apron at the sides of the machine, and also extend upwardly between the rolls (Figs. 6, 7 and 7ª) for the purpose of keeping the compound on the apron and preventing it from dropping off the apron at the sides. It will also be noted that by using an air cylinder for raising and lowering the apron, the latter may be cushioned as it moves in either direction.

In order to insure still further against lateral vibration or wabbling of the apron, I provide one or more apron supporting rollers with grooves such as the groove 26ᵇ in the roller 26ª, shown in Fig. 9. The apron 25ª is provided with a longitudinal series of spaced lugs 92 on its under surface to engage the groove. Preferably, the lugs and the groove are slightly beveled at the sides. The lugs are so spaced from each other that at least one or more will be in engagement with the groove at any given time so as to prevent lateral deviation of the apron from a definite path. The lugs 92 may be made of strips of leather or other material, and they may be quite deep so as to obtain a tight grip between roll and apron. It has been proposed to use a continuous strip on the apron engaging the groove in the roller, but such strip has to be so thin in order to bend around the roller that it is of little service in keeping the apron in a proper position. By having the lugs 92 separated from each other, as stated, the apron can easily bend around the roller, notwithstanding the depth of the lugs. Various changes in the minor details of the construction may be adopted without departing from the scope of the invention as defined in the claims.

What I claim, is:—

1. In a mixing mill, the combination of mixing rolls, an endless feed apron adapted to be moved into and out of coöperation with the rolls, and means for holding the apron taut when in the inoperative position; substantially as described.

2. In a mixing mill, the combination of mixing rolls, an endless feed apron adapted to be moved into and out of coöperation therewith, and means for holding the apron taut when in the inoperative position as well as when in the operative position; substantially as described.

3. In a mixing mill, the combination of mixing rolls, an endless feed apron coöperating therewith, and means for swinging a portion of the apron toward and away from one of the rolls, while maintaining the apron substantially taut; substantially as described.

4. In a mixing mill, the combination of mixing rolls, an endless feed apron coöperating therewith and driven by contact with one of said rolls, and means for swinging the apron out of contact with said roll, while maintaining it in a taut condition; substantially as described.

5. In a mixing mill, the combination of mixing rolls, an endless feed apron coöperating therewith and adapted to be driven by contact with one of said rolls, and means including a frame for swinging said apron away from said last named roll, while maintaining it in a substantially taut condition; substantially as described.

6. In a mixing mill, the combination of mixing rolls, an endless feed apron coöperating therewith, a pan below the apron, and means for swinging a portion of the apron out of contact with one of said rolls and downward toward the pan to an inoperative position, and for maintaining said apron taut while in such inoperative position; substantially as described.

7. In a mixing mill, the combination of mixing rolls, an endless feed apron coöperating therewith and adapted to be driven by one of said rolls, and means including a pivoted frame with two apron supporting elements carried thereby for holding the apron in a taut condition against one of said rolls or in a taut condition away from said last named roll; substantially as described.

8. In a mixing mill, the combination of mixing rolls, an endless feed apron located beneath the same, a frame pivoted adjacent one of said rolls, a plurality of rollers journaled in said frame for supporting the apron in contact with said roll, and means for moving the frame away from its coöperating roll into a position wherein the apron is maintained in a taut condition; substantially as described.

9. In a mixing mill, the combination of mixing rolls, an endless feed apron located beneath the same, a frame located in front of said rolls and pivoted at its lower end portion, and a plurality of apron supporting rollers journaled in said frame, said rollers adapted to maintain said apron in a taut condition, irrespective of the swinging movement of said frame; substantially as described.

10. In a mixing mill, the combination of mixing rolls, an endless feed apron located below the same, and means for swinging a portion of the apron loop into and out of contact with one of said rolls, while maintaining the apron substantially taut; substantially as described.

11. In a mixing mill, the combination of mixing rolls, an endless feed apron located below the same, and means for swinging a portion of the apron loop into and out of contact with one of said rolls, while maintaining the apron substantially taut, said means including a frame carrying a plurality of apron supporting rollers and pivoted eccentrically to said apron supporting rollers; substantially as described.

12. In a mixing mill, the combination of mixing rolls, an endless feed apron supported beneath the same, and a pan beneath said feed apron, said feed apron being entirely independent of said pan and being spaced substantially above the same to leave the end of the pan substantially open and unobstructed; substantially as described.

13. In a mixing mill, the combination of mixing rolls, an endless feed apron located beneath the same, and a pan beneath said feed apron, said pan being disposed horizontally and a portion of said apron being slanted upward when the apron is in the operative position to afford easy access to the front end of the pan; substantially as described.

14. In a mixing mill, the combination of mixing rolls, an endless feed apron, and means for swinging a portion of the feed apron into and out of contact with the front surface of the front roll, a portion of said apron being slanted upward with respect to the pan when the apron is in the operative position so as to leave the free end of the pan open and readily accessible; substantially as described.

15. In a mixing mill, the combination of an endless feed apron, having a longitudinally extending series of lugs on the under surface thereof, and an apron supporting roller having a transverse groove successively engaged by said lugs, the latter being so spaced that at least one lug is engaged with the groove at any given time to prevent wabbling of the apron; substantially as described.

16. In a mixing mill, the combination of mixing rolls, an endless feed apron adapted to be moved into and out of coöperation with said rolls, means for holding said apron in coöperation with said rolls, and means for holding the apron taut when the same is moved out of coöperation with the rolls; substantially as described.

17. In a mixing mill, the combination of mixing rolls, an endless feed apron adapted to be moved into and out of contact with one of said rolls, means for holding said apron in contact with one of said rolls, and means for holding said apron taut when out of contact with said roll as well as when said apron is in contact with the same; substantially as described.

18. In a mixing mill, the combination of mixing rolls, an endless feed apron, and means for swinging a portion of the apron toward and away from one of said rolls, while maintaining the apron substantially taut, and for holding the apron in contact with said last named roll; substantially as described.

19. In a mixing mill, the combination of mixing rolls, an endless feed apron, means for holding said feed apron in contact with one of said rolls, said apron adapted to be moved out of contact with said roll, means for holding the apron out of contact with said roll, and means for holding the apron taut while out of contact with said roll; substantially as described.

20. In a mixing mill, the combination of mixing rolls, a feed apron, a fluid pressure device to hold said apron in contact with one of said rolls, and means for holding the apron taut when moved out of contact with said roll; substantially as described.

21. In a mixing mill, the combination of mixing rolls, a feed apron normally out of contact with one of said rolls, a fluid pressure device for holding said feed apron in contact with said roll, means for operating said fluid pressure device so that the apron moves out of contact with said roll, and means for holding the apron taut when it is moved out of contact with said roll; substantially as described.

22. In a mixing mill, the combination of mixing rolls, an endless feed apron coöperating therewith and adapted to be driven by one of said rolls, a pivoted frame with at least two apron supporting elements carried thereby for holding the apron in a taut condition against one of said roll or in a taut condition away from said last named roll; and a fluid pressure device for operating said pivoted frame; substantially as described.

23. In a mixing mill, the combination of mixing rolls, an endless feed apron located below the same and means for swinging a portion of the apron loop into and out of contact with one of said rolls, while maintaining the apron substantially taut, said means including a frame carrying a plurality of apron supporting rollers and pivoted eccentrically to said apron supporting rollers, and a fluid pressure device acting on said frame to hold the apron in contact with said mixing roll; substantially as described.

24. In a mixing mill, the combination of mixing rolls, an endless feed apron located below the same, and means for swinging a portion of the apron loop into and out of contact with one of said rolls, while maintaining the apron substantially taut, said means including a frame carrying a plurality of apron supporting rollers and pivoted eccentrically to said apron supporting rollers, a fluid pressure device acting on said frame to hold the apron in contact with said mixing roll, and means for controlling the operation of said fluid pressure device, said frame and the apron loop supported thereby being free to move the apron out of contact with its coöperating roll when said controlling means is suitably actuated; substantially as described.

25. In a mixing mill, the combination of mixing rolls, an endless feed apron supported beneath the same, and guides located beneath the rolls near the respective ends of the latter for preventing the material from falling off the apron at the sides; substantially as described.

26. In a mixing mill, the combination of mixing rolls, an endless feed apron supported beneath the same, and guides extending rearwardly from the rolls along the side edges of the upper run of the apron to prevent the material from dropping off the apron at the sides; substantially as described.

27. The combination of front and rear mixing rolls, an endless feed apron supported beneath the same and having a portion in contact with the front roll, another portion of said apron directed rearwardly and horizontally beneath the rear roll, and guide members located between and beneath said rolls adjacent the edges of the horizontal portion of the apron and extending rearwardly beneath the rear roll along such edges; substantially as described.

28. In a mixing mill, the combination of a frame, front and rear mixing rolls journaled therein, a pan supported in the frame beneath said rolls, a swinging frame pivoted in front of and adjacent the lower portion of the front roll, a roller mounted on the frame beneath and somewhat to the rear of the rear roll, said roller located beneath the pivotal axis of said swinging frame, rollers carried by said swinging frame and located one above the other, and an endless apron supported on and passing around said first-named roller, and supported in contact with the front mixing roll by the upper roller on said swinging frame, the lower roller on said swinging frame being interposed in the loop of the apron, and the apron when in the operative position being slanted upward over the lower roller of the swinging frame so as to afford access to the front of the pan; substantially as described.

29. In a mixing mill, the combination of a main frame, front and rear mixing rolls journaled therein, a pan supported in the frame beneath said rolls, a swinging roller-carrying frame pivoted to said main frame in front of and adjacent the lower portion of the front mixing roll, an apron supporting roller mounted in said swinging frame above the pivotal axis thereof, a second apron supporting roller mounted in said frame above the first roller, a third apron supporting roller carried by the main frame beneath and behind the rear mixing roll, said last-named roller located below the pivotal axis of said swinging frame, an apron supported on said rollers, and means acting on the swinging frame to hold the apron in the operative position; substantially as described.

30. In a mixing mill, the combination of a main frame, front and rear mixing rolls journaled therein, a pan supported by said frame beneath said mixing rolls, a swinging roller supporting frame pivoted to said main frame in front of and adjacent the lower portion of the front mixing roll, apron supporting rollers mounted in said swinging frame above the pivotal axis thereof, an apron supporting roller mounted on the main frame beneath and to the rear of the main mixing roll, said last-named roller located beneath the pivotal axis of said swinging frame, another apron supporting roller mounted beneath said mixing rolls approximately in horizontal alinement with said last-named roller, an endless apron supported on the several rollers, and means for holding the apron in the operative position; substantially as described.

31. In a mixing mill, the combination of a main frame, front and rear mixing rolls journaled therein, a swinging roller carrying frame pivoted to said main frame in front of and adjacent the lower portion of the front mixing roll, an apron supporting roller carried by said swinging frame somewhat above the pivotal axis thereof, a second apron supporting roller carried by said swinging frame adjacent the free extremity thereof, a third apron supporting roller carried by the main frame beneath and to the rear of the rear mixing roll, a fourth apron supporting roller substantially in horizontal alinement with said third apron supporting roller and supported by the main frame between the first and third rollers, an apron supported on the several rollers and slanted upwardly from the fourth roller to the first roller, a pan supported beneath the apron, and means for holding the apron in the operative position; substantially as described.

32. In a mixing mill, the combination of a main frame, a pair of mixing rolls journaled therein, a swinging apron supporting frame mounted in said main frame, an apron supported by said swinging frame and adapted to contact with one of said mixing rolls, a horizontal winding shaft, a vertically arranged fluid actuated cylinder and piston carried by the main frame for actuating said winding shaft, and flexible members adapted to be wound on said winding shaft and operatively connected to the sides of said swinging apron supporting frame; substantially as described.

33. In a mixing mill, the combination of a main frame, a pair of mixing rolls journaled therein, a swinging apron supporting frame mounted adjacent the front mixing roll, a horizontal winding shaft mounted at the rear of the machine and carrying a drum, an upright fluid actuated cylinder and piston carried by the frame, a flexible member attached to the drum of said winding shaft and connected with said piston, and flexible members wound on said winding shaft and connected with said swinging frame; substantially as described.

34. In a mixing mill, the combination of a main frame, a pair of mixing rolls journaled therein, a swinging apron supporting frame mounted adjacent the front mixing roll, a horizontal winding shaft carried by the main frame, a drum carried by said winding shaft, a rope connecting said drum with a fixed point, an upright fluid actuated cylinder and piston, a sheave on the piston engaging said rope for actuating said winding shaft, and means of connection between said winding shaft and the swinging apron supporting frame; substantially as described.

35. In a mixing mill, the combination of a main frame, front and rear mixing rolls journaled therein, an endless feed apron supported beneath said rolls, and guides secured to said main frame and located beneath and between the rolls near the respective ends thereof for preventing the material from falling off the apron at the sides, said guides extending upward from the upper run of the apron into the space between said rolls; substantially as described.

In witness whereof, I have hereunto set my hand on the 14th day of August, 1915.

BERNARD O. HALE.